US011989715B2

(12) United States Patent
Philliou et al.

(10) Patent No.: US 11,989,715 B2
(45) Date of Patent: May 21, 2024

(54) SYSTEMS AND METHODS FOR PROCESSING ELECTRONIC TRANSACTIONS BASED ON CONSUMER CHARACTERISTICS

(71) Applicant: Yahoo Assets LLC, Dulles, VA (US)

(72) Inventors: Philip J. Philliou, Haworth, NJ (US); Dean S. Pappas, Middletown, NJ (US); Jonathan I. Brod, New York, NY (US); Kenneth H. Dichter, Livingston, NJ (US); Timothy J. Lemmon, New York, NY (US)

(73) Assignee: Yahoo Assets LLC, New York, NY (US)

( * ) Notice: Subject to any disclaimer, the term of this patent is extended or adjusted under 35 U.S.C. 154(b) by 43 days.

(21) Appl. No.: 17/183,854

(22) Filed: Feb. 24, 2021

(65) Prior Publication Data

US 2021/0182825 A1    Jun. 17, 2021

Related U.S. Application Data

(63) Continuation of application No. 13/790,752, filed on Mar. 8, 2013, now Pat. No. 10,963,857.

(60) Provisional application No. 61/730,387, filed on Nov. 27, 2012.

(51) Int. Cl.
| | |
|---|---|
| *G06Q 30/00* | (2023.01) |
| *G06Q 20/20* | (2012.01) |
| *G06Q 20/24* | (2012.01) |
| *G06Q 20/34* | (2012.01) |
| *G06Q 20/38* | (2012.01) |

(52) U.S. Cl.
CPC .......... *G06Q 20/24* (2013.01); *G06Q 20/204* (2013.01); *G06Q 20/357* (2013.01); *G06Q 20/387* (2013.01)

(58) Field of Classification Search
CPC ...................................................... G06Q 20/24
USPC ............... 705/39, 1.1, 44, 35, 14.45, 38, 80; 235/375, 379; 455/408, 410
See application file for complete search history.

(56) References Cited

U.S. PATENT DOCUMENTS

| | | |
|---|---|---|
| 5,974,146 A | 10/1999 | Randle et al. |
| 6,868,391 B1 | 3/2005 | Hultgren |
| 7,440,915 B1 | 10/2008 | Ulrich |

(Continued)

OTHER PUBLICATIONS

ProQuestDialogNPL Search History.*

(Continued)

*Primary Examiner* — John H. Holly

(74) *Attorney, Agent, or Firm* — Bookoff McAndrews, PLLC

(57) ABSTRACT

Methods are disclosed for processing electronic transactions between a merchant and a consumer based on physical geography. A method includes receiving payment data associated with a consumer payment card; transmitting the payment data, over a network, to a third party; receiving, over the network, information for determining whether a geofence associated with the merchant matches a geofence associated with the consumer; and processing a transaction with the consumer based on whether the consumer geofence ID matches a geofence ID associated with the merchant. Systems for processing electronic transactions between a merchant and a consumer based on physical geography are also disclosed.

8 Claims, 8 Drawing Sheets

(56) References Cited

U.S. PATENT DOCUMENTS

| | | |
|---|---|---|
| 7,499,889 B2 | 3/2009 | Golan et al. |
| 7,676,415 B2 | 3/2010 | Foss, Jr. et al. |
| 7,676,429 B2 | 3/2010 | Boyle et al. |
| 7,702,583 B1 | 4/2010 | Hamilton et al. |
| 7,752,134 B2 | 7/2010 | Spear |
| 7,760,137 B2 | 7/2010 | Martucci et al. |
| 7,934,639 B1 | 5/2011 | Chen et al. |
| 8,010,424 B1 | 8/2011 | Hamilton et al. |
| 8,019,532 B2 * | 9/2011 | Sheha .................... G09B 29/10 340/995.14 |
| 8,766,791 B2 | 7/2014 | Koen et al. |
| 9,311,685 B2 | 4/2016 | Harkey et al. |
| 2002/0152180 A1 * | 10/2002 | Turgeon ................ H04L 9/3226 705/72 |
| 2007/0011089 A1 | 1/2007 | DeSchryver |
| 2008/0306825 A1 | 12/2008 | Schick et al. |
| 2009/0055091 A1 | 2/2009 | Hines et al. |
| 2009/0063334 A1 | 3/2009 | Duncan |
| 2009/0164250 A1 | 6/2009 | Hamilton et al. |
| 2010/0057503 A1 | 3/2010 | Katz |
| 2010/0241501 A1 | 9/2010 | Marshall |
| 2010/0250354 A1 | 9/2010 | Waucampt |
| 2010/0250356 A1 | 9/2010 | Gillenson et al. |
| 2010/0274678 A1 | 10/2010 | Rolf et al. |
| 2010/0318460 A1 | 12/2010 | Stewart et al. |
| 2011/0000961 A1 | 1/2011 | McNeal |
| 2011/0004497 A1 | 1/2011 | Mortimore, Jr. et al. |
| 2011/0057025 A1 * | 3/2011 | Denzer .................. G06Q 20/28 235/375 |
| 2011/0117966 A1 | 5/2011 | Coppinger |
| 2011/0137773 A1 | 6/2011 | Davis, III et al. |
| 2011/0178811 A1 | 7/2011 | Sheridan |
| 2011/0202415 A1 | 8/2011 | Casares et al. |
| 2011/0215138 A1 | 9/2011 | Crum |
| 2011/0231911 A1 | 9/2011 | White et al. |
| 2011/0237224 A1 | 9/2011 | Coppinger |
| 2011/0251892 A1 | 10/2011 | Laracey |
| 2011/0256881 A1 | 10/2011 | Huang et al. |
| 2011/0258028 A1 | 10/2011 | Satyavolu et al. |
| 2011/0258076 A1 | 10/2011 | Muirbrook |
| 2012/0101887 A1 | 4/2012 | Harvey et al. |
| 2012/0246074 A1 | 9/2012 | Annamalai et al. |
| 2013/0185206 A1 | 7/2013 | Leggett et al. |
| 2015/0161585 A1 * | 6/2015 | Huster ............... G06Q 20/3224 705/44 |

OTHER PUBLICATIONS

International Search Report and Written Opinion from corresponding PCT Application No. PCT/US2013/72045, dated Jun. 18, 2014 (10pages).

* cited by examiner

SYSTEMS AND METHODS FOR PROCESSING ELECTRONIC TRANSACTIONS BASED ON CONSUMER CHARACTERISTICS

RELATED APPLICATION(S)

This application is a continuation of and claims the benefit of priority to U.S. application Ser. No. 13/790,752, filed Mar. 8, 2013, which claims priority to U.S. Provisional Patent Application No. 61/730,387 filed Nov. 27, 2012, the entireties of which are incorporated herein by reference.

TECHNICAL FIELD

Various embodiments of the present disclosure relate generally to processing electronic transactions. More specifically, particular embodiments of the present disclosure relate to systems and methods for processing electronic transactions based on consumer characteristics, such as, for example, physical geography or association.

BACKGROUND

When a consumer uses an electronic payment method, such as a credit, debit, or prepaid card as currency, whether at a brick-and-mortar or online retailer, an orchestrated series of communications and transactions take place to ultimately transfer payment from the consumer to the merchant. In the case of most credit cards, once a consumer swipes his or her card, or otherwise initiates a transaction, the merchant submits a request for the payment to a credit card "acquiring bank" or "acquirer," which sends an authorization request to the consumer's respective credit card "issuer" (e.g., CapitalOne or Bank of America). The consumer's credit card issuer then determines if enough funds are available, and generates an authorization code for sending back to the acquirer over a card network (e.g., Visa or MasterCard). The acquirer then informs the merchant whether the transaction is authorized. Over time following the transaction, the parties carry out a process of batching and clearing transactions, and funding merchants from funds that are ultimately obtained from respective consumer cardholders.

To fund this process, each time a merchant swipes or processes a consumer's credit, debit, or prepaid card, the merchant is typically required to pay an interchange, or "swipe" fee. The interchange fee is typically set by the credit card networks, and split between the acquiring bank, card issuer, and other intermediaries. Often, the amount of the fee charged to the merchant depends on a number of factors, including the type of card used (e.g., premium rewards cards have higher fees than debit cards) and the type of transaction (e.g., online merchants pay higher fees than brick-and-mortar stores). However, unbeknownst to most consumers, the amount of the interchange fee also depends on the identity of the merchant. Typically, small businesses, such as gas stations and boutiques, pay the highest fees, whereas big box retailers like Target and Walmart are able to negotiate lower fees based on, e.g., volume of transactions.

This system not only burdens small merchants with relatively higher fees, but it can also result in policies that incentivize consumers to favor big box retailers over small merchants. For instance, due to the burdens of high fees, small merchants may impose mandatory minimums on credit purchases, refuse to accept premium rewards cards (e.g., American Express), or even refuse to accept credit cards at all. As a result, some consumers may be driven away from small and local merchants, in favor of big box retailers and other national chains.

Moreover, many credit card issuers have implemented rewards programs that incentivize consumers to favor big box retailers and other national chains over small businesses. For example, consumers might earn "double points" for shopping at one of a selected set of different national chains with whom that credit card issuer has negotiated some form of discount or profit sharing arrangement. Again, this might cause consumers to favor shopping at large national chains over local small businesses.

These challenges are so significant that the United States Congress recently passed legislation capping interchange fees and allowing merchants to charge their own incentive fees for use of cash or debit cards over credit cards. However, these legislative efforts do not solve the underlying problems of small merchants lacking the leverage to negotiate lower interchange fees or to secure consumer incentives through credit issuer rewards programs. Moreover, because existing techniques do not process transactions differently based on physical geography or characteristics of consumers or merchants, consumers may have an incentive to travel to large national chains, instead of more local, small merchants.

Accordingly, a need exists for systems and methods for enabling merchants to generate their own incentives to attract local credit consumers. More generally, a need exists for systems and methods for processing electronic transactions based on physical geography.

SUMMARY

According to an exemplary embodiment, a method is disclosed for processing electronic transactions between a merchant and a consumer based on physical geography. The method includes receiving payment data associated with a consumer payment card; transmitting the payment data, over a network, to a third party; receiving, over the network, information for determining whether a geofence associated with the merchant matches a geofence associated with the consumer; and processing a transaction with the consumer based on whether the consumer geofence ID matches a geofence ID associated with the merchant.

According to another exemplary embodiment, a method is disclosed for processing transactions based on a characteristic. The method includes receiving from a merchant, over an electronic network, payment data associated with a consumer; processing the received payment data to determine a characteristic associated with the consumer; determining whether the consumer characteristic matches a characteristic associated with the merchant; and transmitting to the merchant, over an electronic network, the results of the comparison between the consumer characteristic and the merchant characteristic.

According to another exemplary embodiment, a method is disclosed for processing electronic transactions between a merchant and a consumer based on physical geography. The method includes receiving payment data associated with an electronic payment mode; transmitting the payment data, over a network, to a third party; receiving from the third party, over a network, information indicative of whether a geofence associated with the merchant matches a geofence associated with the consumer; and processing a transaction with the consumer based on the received information indicative of whether the geofence associated with the merchant matches the geofence associated with the consumer.

According to another exemplary embodiment, a system is disclosed for processing electronic transactions based on physical geography. The system includes a data storage device storing instructions for processing electronic transactions based on a unique characteristic; and a processor configured to execute the instructions to perform a method including receiving payment data associated with a consumer payment card; transmitting the payment data, over a network, to a third party; receiving, over the network, information for determining whether a geofence associated with the merchant matches a geofence associated with the consumer; and processing a transaction with the consumer based on whether the consumer geofence ID matches a geofence ID associated with the merchant.

Additional embodiments and advantages will be set forth in part in the description which follows, and in part will be obvious from the description, or may be learned by practice of the disclosure. The embodiments and advantages will be realized and attained by means of the elements and combinations particularly pointed out below.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

In view of the challenges outlined above, systems and methods are disclosed for enabling merchants to generate unique incentives to attract cardholding consumers based on known characteristics, such as, for example, geographic locations, affiliations with organizations, including other merchants, educational institutions, sports organizations, political organizations, etc. For example, systems and methods are disclosed for enabling merchants to process consumer transactions differently based on an address or other geographical identifier of record for the cardholder. As alluded to above, other known characteristics may also be used in conjunction with or in the alternative to the principles of the present disclosure. In one embodiment, systems and methods are disclosed for enabling merchants to provide discounts to consumers whose address or other geographical identifier or characteristic(s) corresponds to a characteristic (e.g., geographical identifier) recognized by the merchant. More generally, systems and methods are disclosed for processing electronic transactions based on physical geography or other known characteristics (e.g., organizational affiliation, demographics, buying history, etc.).

Figure 1:
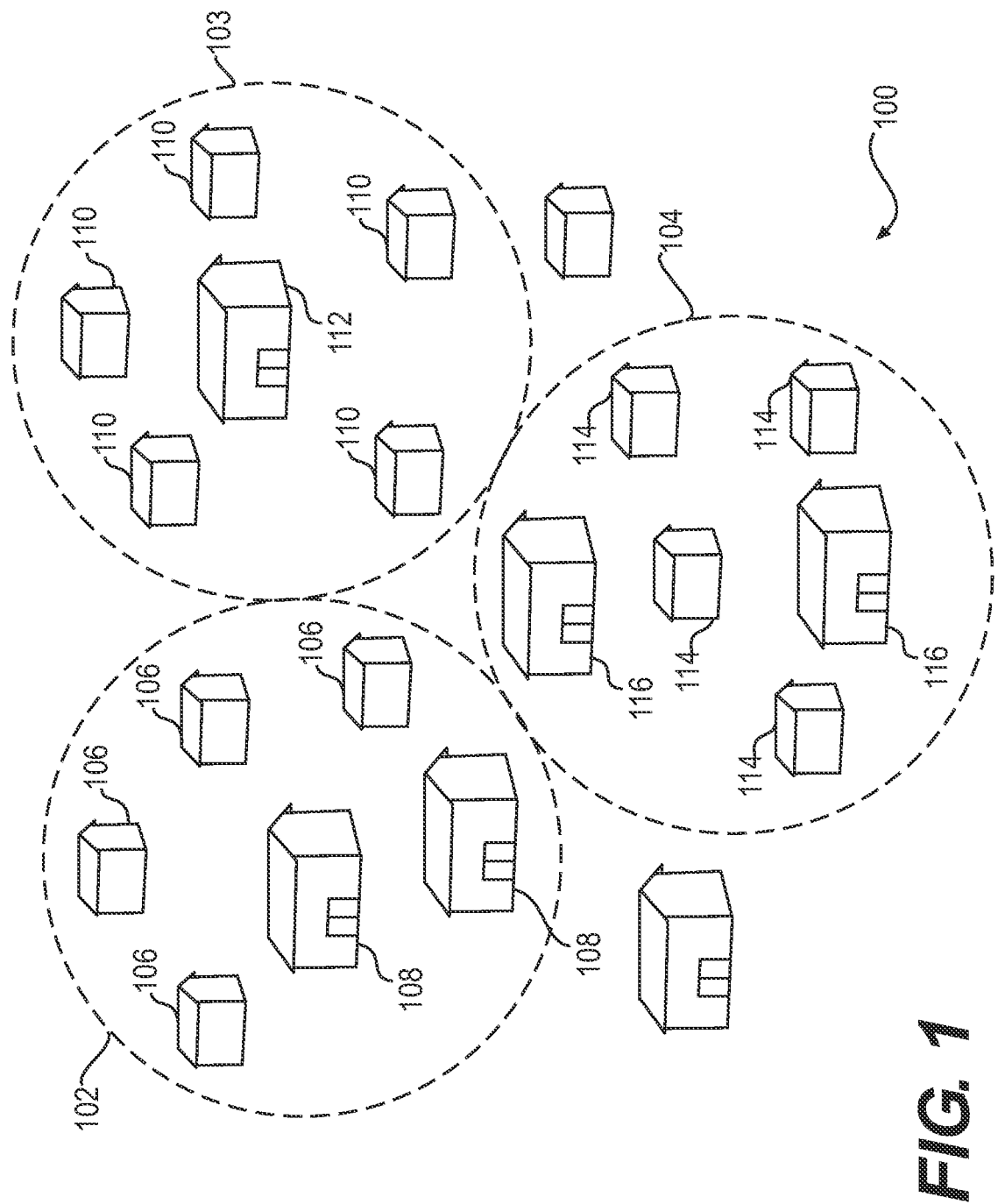
FIG. 1 is a schematic diagram of an environment in which electronic transactions may be processed according to geography, according to an exemplary embodiment of the present disclosure.

FIG. 1 is a schematic diagram of an exemplary environment 100 in which electronic transactions may be processed according to geography, according to an exemplary embodiment of the present disclosure. Environment 100 may include a plurality of geographical areas 102, 103, 104. Each geographical area 102, 103, 104 may be any defined area of physical space, such as a state, city, town, zip code, or municipal boundary. Alternatively, each geographical area 102, 103, 104 may be a neighborhood boundary or even a smaller "hyper-local" geographical boundary. Alternatively, each geographical area 102, 103, 104 may be defined by a grid or other organized division of area, whereby each defined area has a predetermined shape, such as a circle or rectangle. Each geographical area 102, 103, 104 may have a boundary that is referred to as a "geofence" and may be identified or referred to by a geofence ID. A geofence may be any type of geographical identifier, whether static or dynamic, and may be associated with any type of entity. For example, a geofence may be a geographic boundary, a geographic area, or any other physical characteristic.

Other embodiments of the disclosure may define areas, e.g., areas 102, 103, 104, based on known consumer characteristics, such as, for example, affiliations with organizations including, e.g., neighborhood organizations, commercial organizations, academic institutions, professional organizations, trade organizations, religious organizations, sports organizations, or any other suitable organization.

As shown in FIG. 1, within environment 100, a plurality of homes 106 and merchants 108 may be located within geographical area 102; a plurality of homes 110 and merchants 112 may be located within geographical area 103; and a plurality of homes 114 and merchants 116 may be located within geographical area 104.

In one embodiment, each consumer may be associated with a home address that defines the geographical location of his or her home, and each merchant may be associated with a merchant address that defines the geographical location of the merchant. According to an embodiment of the present disclosure, when a consumer's home address is determined to exist within the same geographical area 102, 103, 104 as a merchant's address, that merchant may process one or more transactions with that consumer differently than it does with consumers whose home addresses are determined to exist outside the respective geographical area 102, 103, 104 encompassing the merchant's address, as will be described in more detail below. For example, when consumers associated with one of homes 106 shop at merchants within their geographical area 102 (merchants 108), those transactions may be processed differently than transactions with merchants located outside of geographical area 102. Likewise, when consumers associated with one of homes 110 shop at merchants within their geographical area 103 (merchants 112), those transactions may be processed differently than transactions with merchants located outside of geographical area 103, and so on.

As described above, consumers and merchants may be associated with known consumer characteristics instead of geographical areas (e.g., areas 102, 103, 104). For example, consumers and merchants may be associated with characteristics, such as, for example, affiliations with organizations including, e.g., neighborhood organizations, commercial organizations, academic institutions, professional organizations, trade organizations, religious organizations, sports organizations, or any other suitable organization. As an alternative, each consumer may be associated with an IP address, a work address, or any other electronic or physical mailing address of significance to the consumer. Thus, when merchants are associated, not with a geographical area, but with other characteristics, such as organizations or categories, then consumers associated with those organizations or categories may have their transactions processed differently than those of consumers not associated with those organizations or categories.

Figure 2:
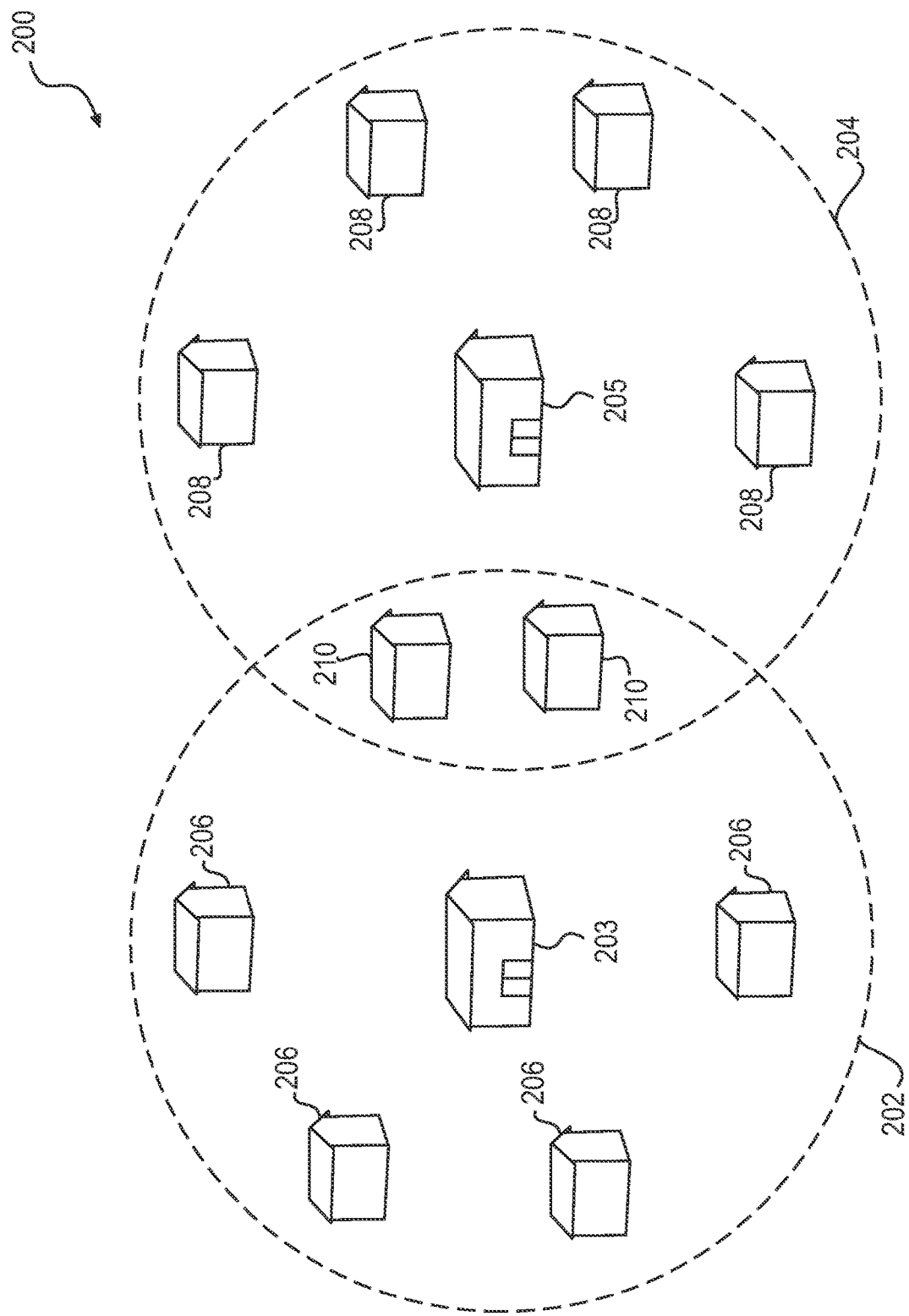
FIG. 2 is a schematic diagram of another environment in which electronic transactions may be processed according to geography, according to an exemplary embodiment of the present disclosure.

FIG. 2 is a schematic diagram of another environment 200 in which electronic transactions may be processed according to geography, according to an exemplary embodiment of the present disclosure. Environment 200 may include a plurality of geographical areas 202, 204. Each geographical area 202, 204 may be any defined area of physical space. In one embodiment, each geographical area 202, 204 may be an area of physical space defined by a distance from a merchant, e.g., merchants 203, 205. For example, in one embodiment, geographical area 202 may be defined by a radius around merchant 203, while geographical area 204 may be defined by a radius around merchant 205. As shown in FIG. 2, a plurality of homes 206, 210 may be positioned within geographical area 202, and a plurality of homes 208, 210 may be positioned within geographical area 204.

According to an embodiment of the present disclosure, when consumers associated with one of homes 206, 210 shop at merchants within their geographical area 202 (merchant 203), those transactions may be processed differently than transactions with consumers outside of geographical area 202. Likewise, when consumers associated with one of homes 208, 210 shop at merchants within their geographical area 204 (merchant 205), those transactions may be processed differently than transactions with consumers outside of geographical area 204, and so on. As shown in FIG. 2, consumers associated with homes 210, which exist within both geographical areas 202, 204, may have transactions processed based on those home addresses being within each of geographical areas 202, 204. Thus, it will be appreciated that each consumer's home may be located within any number of overlapping and/or co-located geographical areas. For example, all consumers having homes within a given radius of a merchant may have their transactions with that merchant processed differently than those of consumers whose homes are located outside of that radius. In addition, a consumer may have his or her transactions with merchants located within a given radius of the consumer's home address be processed differently than those with merchants located outside of that radius.

In one embodiment, merchant 203 may select a radius that defines the size of geographical area 202, and merchant 205 may select a radius that defines the size of geographical area 204. In one embodiment, merchants 203, 205 may define the radius based on how differently a transaction is processed (i.e., an extent of a discount offered to consumers living within that radius). In another embodiment, each consumer may select a radius that defines a size of a geographical area encompassing the merchants with whom the consumer's transactions are processed differently than those merchants outside that geographical area. In yet another embodiment, each affiliated organization (e.g., neighborhood, school, workplace, sports team, etc.) may select a radius that defines a size of a geographical area encompassing the merchants with whom the consumer's transactions are processed differently than those merchants outside that geographical area.

Figure 3:
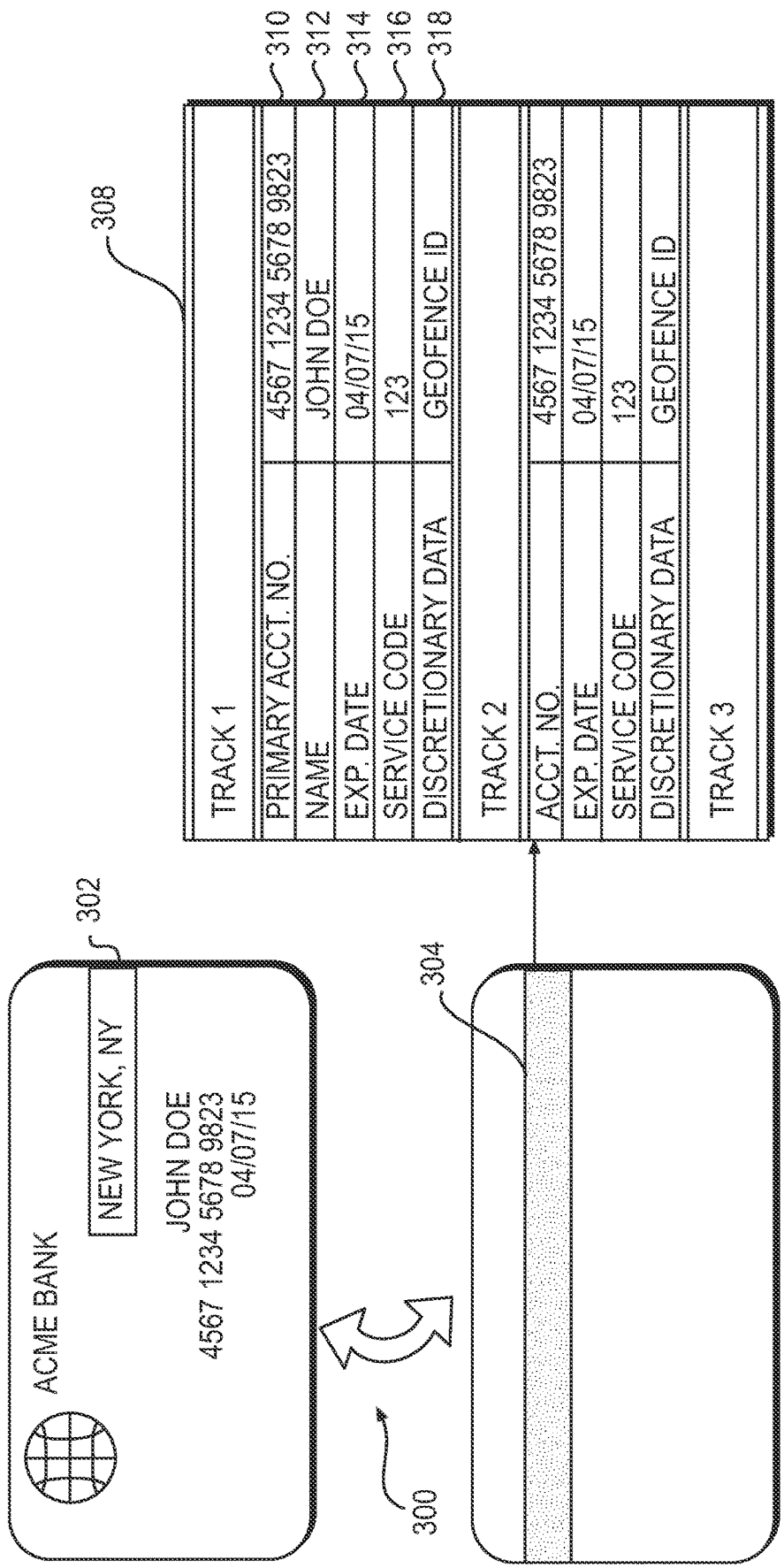
FIG. 3 is a schematic diagram of a payment card and a data record stored by the payment card, according to an exemplary embodiment of the present disclosure.

FIG. 3 is a schematic diagram of a payment card 300 and a data record 308 associated with a payment mode, such as a mobile device or payment card 300, according to an exemplary embodiment of the present disclosure. For example, data record 308 may be stored on a payment card in any suitable manner, such as within a magnetic stripe, or in an RFID chip embedded in a payment card or mobile device. In one embodiment, payment card 300 may contain indicia 302 identifying a geographical area, geofence, and/or geocode ID. For example, indicia 302 may include the name of a city, zip code, neighborhood, or ID number (e.g., GEO1234). Indicia 302 may indicate a geographical area or geofence associated with the cardholder's home address. For example, if a cardholder lives within Manhattan, NY, and has a Manhattan home address on file with the cardholder's card issuer or has a Manhattan billing address, the payment card 300 may contain indicia 302 labeled "Manhattan," to identify that the cardholder's home is within a Manhattan geofence. In another embodiment, indicia 302 may identify, either by name or a corresponding ID, an affiliated organization (e.g., neighborhood, school, workplace, sports team, etc.) for which merchants may process a consumer's transactions differently than other those of other consumers.

In addition, as shown in FIG. 3, an opposite side of payment card 300 may contain a magnetic stripe 304, as is typical of many payment cards. Magnetic stripe 304 may contain encoded data which, when read by a magnetic card reader, enables access to a data record 308. In certain embodiments, data record 308 may contain a plurality of "tracks," each track containing different data elements regarding the cardholder, card issuer, or other information relevant to a commercial transaction. For example, as shown in FIG. 3, data record 308, as stored in magnetic stripe 304, may store data including: a cardholder's account number 310, a cardholder's name 312, a card expiration date 314, a service (e.g., security) code 316, and discretionary data 318. In one embodiment, discretionary data 318 may be provisioned for storing the geographical area, geofence, and/or geofence ID contained in indicia 302. Alternatively or additionally, data record 308, including, e.g., an account number, a payer's name, a security code, and discretionary data (e.g. geographical area, geofence, and/or geofence ID) may be contained in a chip or other storage device of a mobile device.

Discretionary data field 318 may also or alternatively store any other characteristic of a consumer, as described above, such as, e.g., a school name, workplace name, sports team name, etc. For example, if the cardholder lives within Manhattan, NY, and has a Manhattan home address on file with the cardholder's card issuer, the discretionary data 318 may contain the word "Manhattan," (or an identifying geofence ID) to identify that the cardholder's home is within a Manhattan geofence. Thus, when a merchant swipes a cardholder's payment card 300, the merchant may transmit, e.g., to an acquirer or other party, the cardholder's geographical area, geofence, and/or geocode ID, as encoded in magnetic stripe 304.

Figure 4:
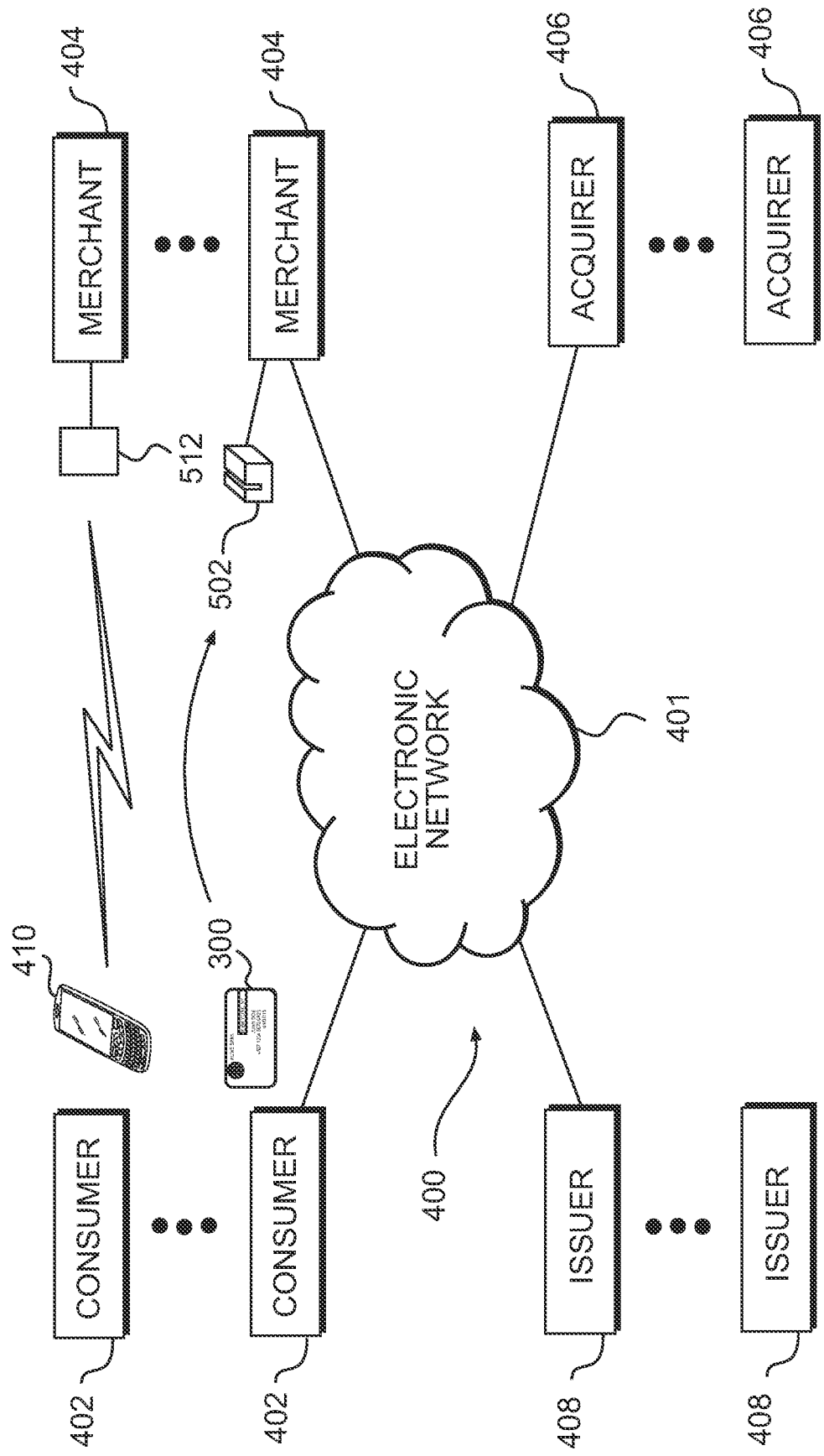
FIG. 4 is a block diagram of an exemplary electronic network and environment for processing electronic transactions according to geography, according to an exemplary embodiment of the present disclosure.

FIG. 4 is a block diagram of an exemplary environment 400 and electronic network 401 for processing electronic transactions according to geography, according to an exemplary embodiment of the present disclosure. As shown in FIG. 4, a plurality of consumers 402 may be disposed in communication with a plurality of merchants 404. Consumers 402 may be able to offer payments to merchants 404 by a plurality of methods, including: through an electronic network 401 (e.g., by online e-commerce over the Internet), by swiping a payment card 300 through a merchant's card reader 502; by engaging a mobile device 410 with a merchant's corresponding mobile device reader 512 (e.g. using Near Field Communications, Bluetooth, or the like); or by using mobile device 410 to communicate over electronic network 410, such as over the Internet or a mobile network. In any event, merchants 404 may be configured to receive payment information from consumers 402.

Merchants 404 may be provided in communication with acquirers 406 through electronic network 401, which may include the Internet, a credit card network, or any other wired or wireless network. Thus, merchants 404 may be configured to transmit data received from consumers 402 to acquirers 406. As discussed above, acquirers 406 may be banks, financial institutions, or other entities that engage with merchants 404 to process transactions and communicate with a plurality of card issuers 408, either directly or indirectly. Acquirers 406 may implement any type of fixed or mobile computing devices, including processing devices and storage devices, to process data received from merchants 404 and/or issuers 408, over electronic network 401. Acquirers 406 may also be configured to transmit and receive information to and from credit card issuers 408 over electronic network 401, which, again, may include the Internet, a credit card network, or any other wired or wireless network.

Figure 5:
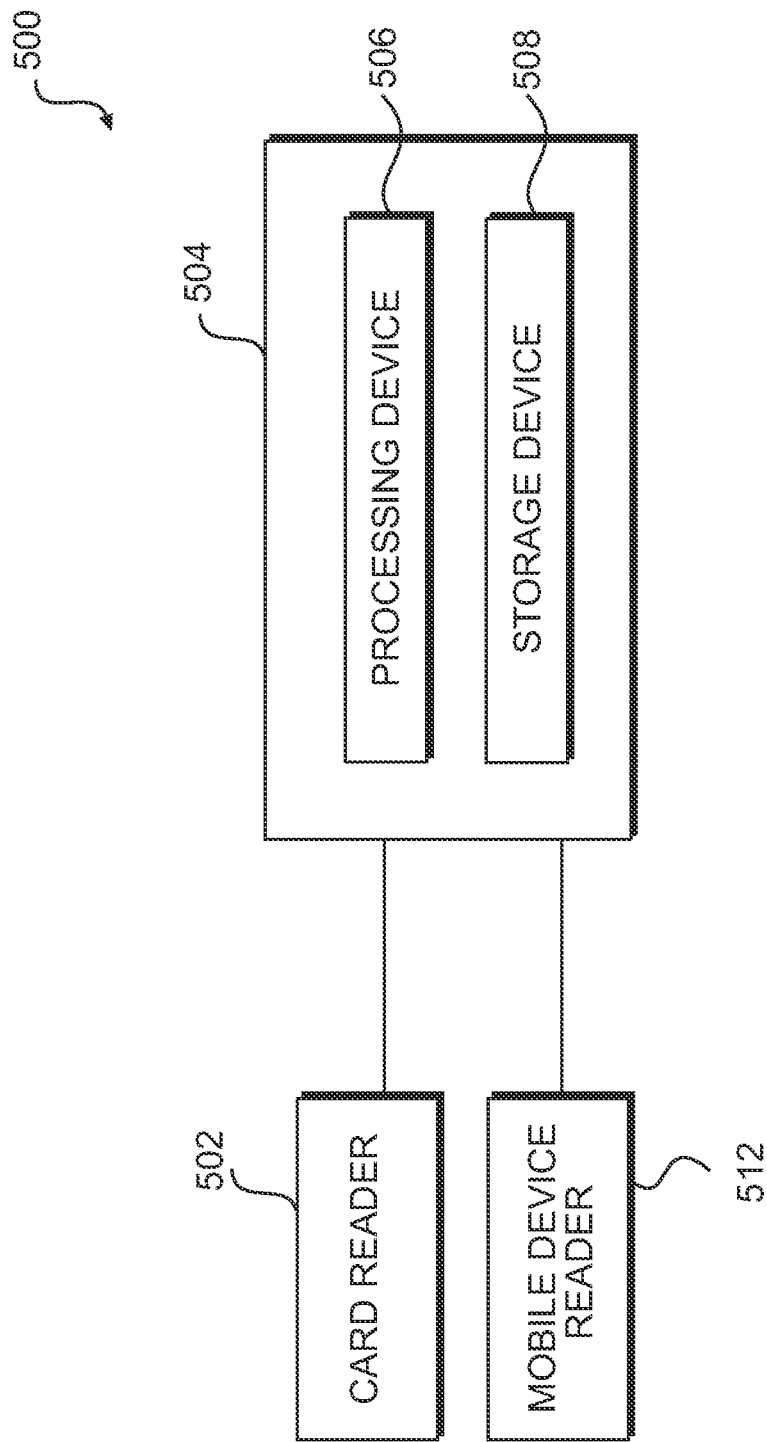
FIG. 5 is a block diagram of an exemplary system for processing electronic transactions according to geography, according to an exemplary embodiment of the present disclosure.

FIG. 5 is a block diagram of an exemplary system 500 for processing electronic transactions according to geography, according to an exemplary embodiment of the present disclosure. System 500 reflects a system that may be implemented by either or both of the merchants 404 and acquirers 406, for communicating with each other over electronic network 401 (e.g., using any suitable modem, wireless adapter, etc.).

As shown in FIG. 5, system 500 may include a computing device 504, including a processing device 506 and a storage device 508. Computing device 504 may be disposed in communication with a card reader 502, configured to decrypt a payment card magnetic stripe to obtain payment information, including a geographic area, geocode, and/or geocode ID from a consumer. Computing device 504 may also be disposed in communication with a mobile device reader 512, which may be any other type of magnetic, radio frequency ID, near field communication, Bluetooth, or any other type of device configured to receive payment information, including a geographic area, geocode, geocode ID from a consumer, and/or any other suitable characteristic. Information or data obtained through card reader 502 and/or mobile device reader 512 may be stored in storage device 508 and processed by processing device 506 according to embodiments described herein. Specifically, when implemented by a merchant, processing device 506 may receive payment information from a consumer and transmit that information to an acquirer. When implemented by an acquirer, processing device 506 may receive payment information from an acquirer, and process the received payment information according to embodiments described herein. It will be appreciated that, whether implemented by merchants or acquirers, computing devices 504 may incorporate any combination of modems, antennae, or any other ports used for communicating data over a wired or wireless network.

Figure 6:
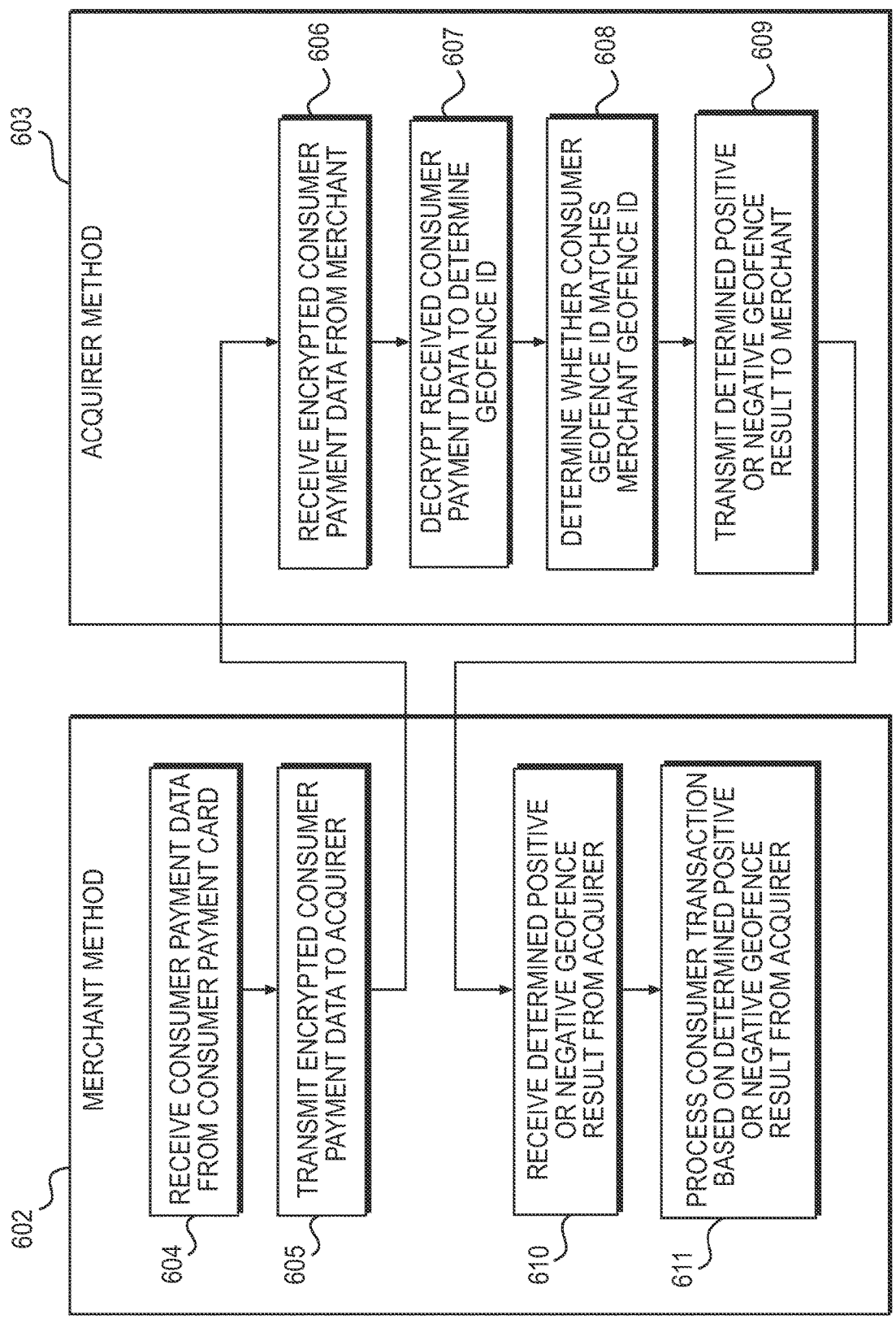
FIG. 6 is a flow diagram of an exemplary method for processing electronic transactions according to geography, according to an exemplary embodiment of the present disclosure.

FIG. 6 is a flow diagram of an exemplary method 600 for processing electronic transactions according to geography, according to an exemplary embodiment of the present disclosure. In one embodiment, method 600 may include a merchant method 602 and an acquirer method 603, each being performed by a merchant 404 and acquirer 406, respectively, through communication of system(s) 500 over electronic network 401, for example. However, it should be appreciated that merchant and acquirer methods 602, 603 may be combined, and/or any step(s) thereof may be performed by the other party (merchant vs. acquirer).

As shown in FIG. 6, method 600 may include a merchant receiving consumer payment data, including a geofence ID, from a consumer payment card (step 604). For example, as discussed above, a merchant 404 may receive consumer payment card data, including geofence or geofence ID, through a magnetic stripe 304 of a payment card 300, via a card reader 502. Of course, merchant 404 may receive consumer payment data, including geofence or geofence ID through any other means, such as a mobile token, mobile device, NFC-enabled device, or any other electronic payment device. The merchant 404 may encrypt and transmit the received consumer payment data, including the geofence or geofence ID, to an acquirer, e.g., over electronic network 401 (step 605). The acquirer may receive the encrypted consumer payment data from the merchant (step 606) and, e.g., using system 500, decrypt the received consumer payment data to determine a geographic area, geofence, and/or geofence ID associated with the cardholder (step 607).

The acquirer may then determine, e.g., using system 500, whether the consumer geofence ID matches the merchant geofence ID (step 608). For example, the acquirer may determine and store each merchant's geofence ID, or each merchant may define and provide its own geofence ID to an acquirer for storage and comparison to consumer geofence IDs. For example, in one embodiment, the acquirer may have stored in storage device 508 of system 500, a plurality of indices or look-up tables that list merchants relative to merchant geofences or geofence IDs. Accordingly, once an acquirer has obtained a cardholder's consumer payment data (including geofence or geofence ID), the acquirer may look-up the merchant's geofence ID, and determine if it matches the received consumer's geofence ID. The acquirer may then transmit a positive or negative result of the geofence matching to the merchant (step 609). The merchant may receive the determined positive or negative result of the geofence matching (step 610), and process the cardholder's transaction based on whether a positive or negative result was received (step 611). In one embodiment, if a positive result was received (i.e., the cardholder's geofence ID matches the merchant's geofence ID), then the merchant may process the cardholder's transaction with a discount or any other incentive to the cardholder. If a negative result was received (i.e., the cardholder's geofence ID does not match the merchant's geofence ID), then the merchant may process the cardholder's transaction as it does for all consumers.

Thus, use of the present systems and methods may incentivize consumers to shop at local merchants within the same geographical area as the consumers' homes. Alternatively or additionally, the systems and methods may incentivize consumers of certain organizational affiliations to shop at certain merchants. The present systems and methods may be used more with independently-owned merchants, as opposed to national retailers. Accordingly, local businesses and small businesses may benefit from being able to attract and reward local and loyal customers. Moreover, because the disclosed systems and methods implement use of data encoded in a payment card, it is unnecessary for consumers to independently sign up for separate rewards programs or provide any additional demographic data to retailers, in order to obtain the disclosed discounts or other benefits.

Figure 7:
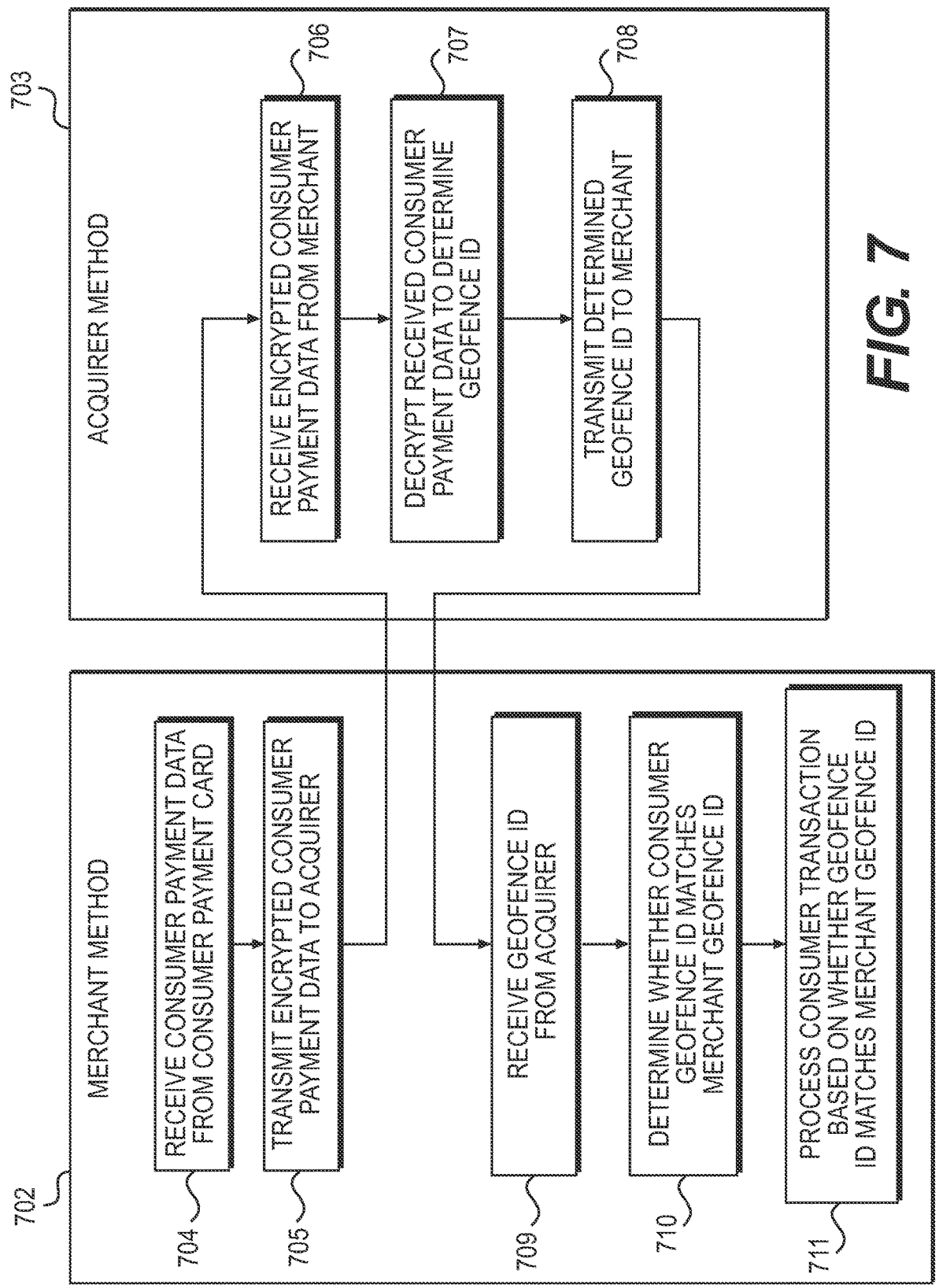
FIG. 7 is a flow diagram of another exemplary method for processing electronic transactions according to geography, according to an exemplary embodiment of the present disclosure.

FIG. 7 is a flow diagram of another exemplary method 700 for processing electronic transactions according to geography, according to an exemplary embodiment of the present disclosure. Again, method 700 may include a merchant method 702 and an acquirer method 703, each being performed by a merchant 404 and acquirer 406, respectively, through communication of system(s) 500 over electronic network 401. However, it should be appreciated that merchant and acquirer methods 702, 703 may be combined, and/or any step(s) thereof may be performed by the other party (merchant vs. acquirer).

As shown in FIG. 7, method 700 may include a merchant receiving consumer payment data from a consumer payment card (step 704). For example, as discussed above, a merchant may receive consumer payment card data, including geofence or geofence ID through a magnetic stripe 304 of a payment card, via a card reader 502. The merchant may transmit encrypted consumer payment data to an acquirer, e.g., over electronic network 401 (step 705). The acquirer may receive the encrypted consumer payment data from the merchant (step 706) and, e.g., using system 500, decrypt the received consumer payment data to determine a geographic area, geofence, and/or geofence ID associated with the cardholder (step 707).

The acquirer may then transmit the determined geofence ID to the merchant, e.g., over electronic network 401 (step 708). The merchant may receive the cardholder's geofence ID from the acquirer (step 709) and determine whether the cardholder's geofence ID matches the merchant's own geofence ID (step 710). For example, if the merchant knows its own geofence ID is "Manhattan" and the merchant receives "Manhattan" (or a corresponding code) from the acquirer, then the merchant may identify the consumer as having a matching geofence ID. The merchant may then process the consumer's transaction based on whether the consumer's geofence ID matches the merchant's geofence ID (step 711). In one embodiment, if a positive result was determined (i.e., the cardholder's geofence ID matches the merchant's geofence ID), then the merchant may process the cardholder's transaction with a discount or any other incentive to the cardholder. If a negative result was determined (i.e., the cardholder's geofence ID does not match the merchant's geofence ID), then the merchant may process the cardholder's transaction as it does for all consumers.

Figure 8:
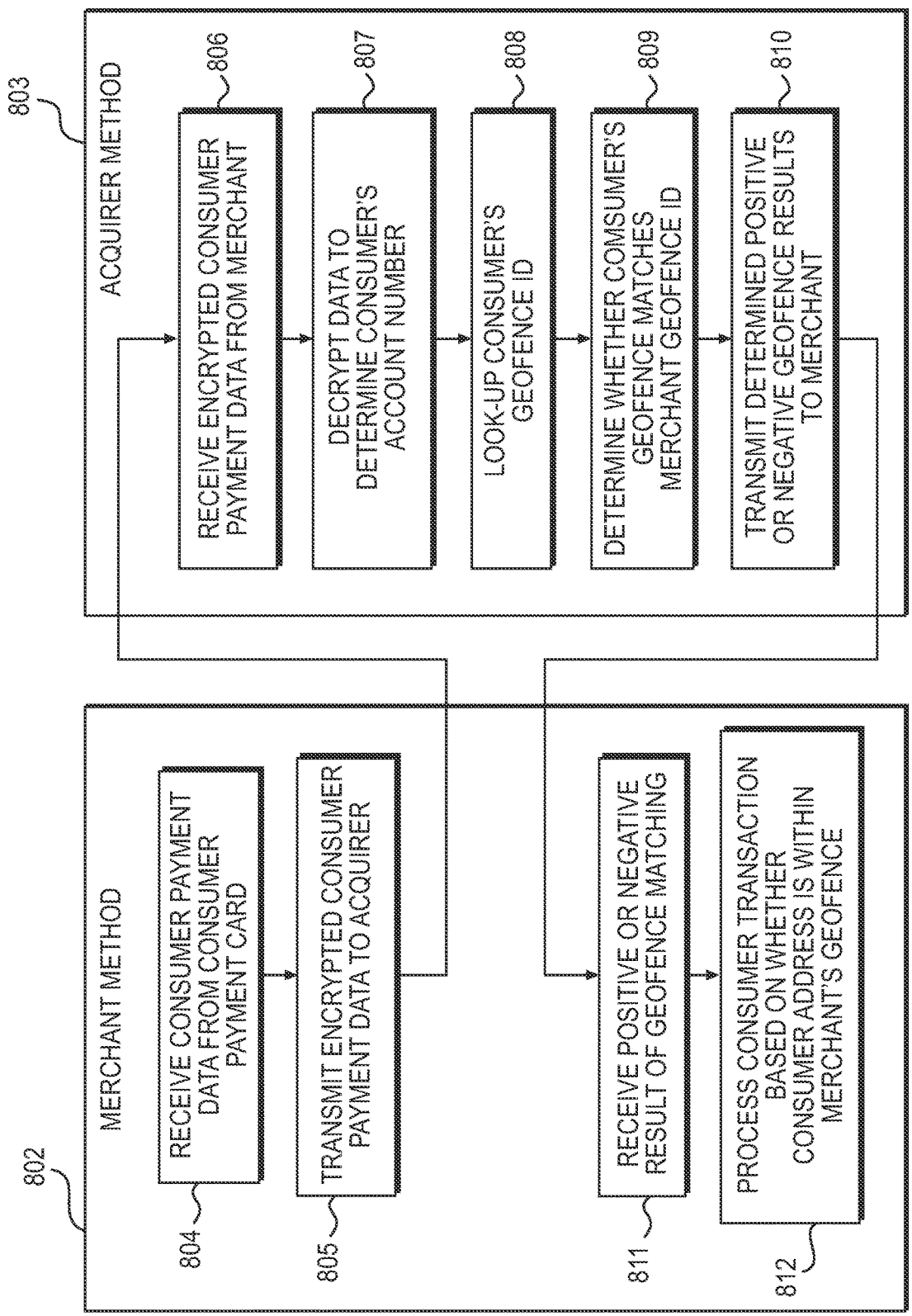
FIG. 8 is a flow diagram of yet another exemplary method for processing electronic transactions according to geography, according to an exemplary embodiment of the present disclosure.

FIG. 8 is a flow diagram of yet another exemplary method 800 for processing electronic transactions according to geography, according to an exemplary embodiment in which a geofence ID is not necessarily encoded into the cardholder's payment card. Again, method 800 may include a merchant method 802 and an acquirer method 803, each being performed by a merchant 404 and acquirer 406, respectively, through communication of system(s) 500 over electronic network 401. However, it should be appreciated that merchant and acquirer methods 802, 803 may be combined, and/or any step(s) thereof may be performed by the other party (merchant vs. acquirer).

As shown in FIG. 8, method 800 may include a merchant receiving consumer payment data from a consumer payment card (step 804). As discussed above, in this embodiment, the consumer's geofence or geofence ID may or may not be encoded in the cardholder's payment card. The merchant may encrypt and transmit the received consumer payment data to an acquirer, e.g., over electronic network 401 (step 805). The acquirer may receive the encrypted consumer payment data from the merchant (step 806) and, e.g., using system 500, decrypt the received consumer payment data to determine at least the cardholder's account number (step 807).

The acquirer may then determine, e.g., using system 500, the consumer's geofence ID (step 808). For example, in one embodiment, the acquirer may have stored in storage device 508 of system 500, a plurality of indices or look-up tables that list consumer cardholders' account numbers in relation to their geofence or geofence ID. For example, the acquirer may receive or determine a cardholder account number, and then look up the account number to determine which geofence ID is stored in relation to the account number. The acquirer may then determine, e.g., using system 500, whether the consumer's looked-up geofence ID matches the merchant's geofence ID (step 809). For example, in one embodiment, the acquirer may have stored in storage device 508 of system 500, a plurality of indices or look-up tables that list merchants relative to merchant geofences or geofence IDs. Accordingly, once an acquirer has obtained a cardholder's geofence or geofence ID, the acquirer may look-up the merchant's geofence ID, and determine if the merchant's geofence ID matches the received consumer's geofence ID.

The acquirer may then transmit a positive or negative result of the geofence matching to the merchant (step 810). The merchant may receive the determined positive or negative result of the geofence matching (step 811), and process the cardholder's transaction based on whether a positive or negative result was received (step 812). In one embodiment, if a positive result was received (i.e., the cardholder's geofence ID matches the merchant's geofence ID), then the merchant may process the cardholder's transaction with a discount or any other incentive to the cardholder. If a negative result was received (i.e., the cardholder's geofence ID does not match the merchant's geofence ID), then the merchant may process the cardholder's transaction as it does for all consumers.

Again, it will be appreciated that practice of the above-disclosed systems and methods may incentivize consumers to shop at local merchants within the same geographical area as the consumers' homes. The present systems and methods may be used more with independently-owned merchants, as opposed to national retailers. Accordingly, local businesses and small businesses may benefit from being able to attract and reward local and loyal customers. Moreover, because the disclosed systems and methods implement use of data encoded in a payment card, it is unnecessary for consumers to independently sign up for separate rewards programs or provide any additional demographic data to retailers, in order to obtain the disclosed discounts or other benefits.

Additional objects and advantages of the disclosed embodiments will be set forth in part in the description that follows, and in part will be apparent from the description, or may be learned by practice of the disclosed embodiments.

The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing electronic transactions between a merchant and a consumer based on physical geography, the method comprising:
   receiving, at a merchant device connected to an electronic network, payment data encoded on a consumer payment card;
   receiving and storing at a server a geofence ID associated with the consumer encoded on the consumer payment card, based on decrypting the payment data at a third party device, wherein the third party device is an acquirer device or issuer device associated with the consumer payment card and accessible over the electronic network;
   determining, using a processing device of the third party, whether a geofence ID associated with the merchant operating the merchant device matches the geofence ID associated with the consumer;
   upon determining that the geofence ID associated with the merchant matches the geofence ID associated with the consumer, performing additional actions including one or more of retrieving from the server a discount or other incentive to provide to the consumer and automatically storing at the server an association of the consumer with a merchant rewards program; and
   modifying a processing of an electronic payments transaction based on the retrieved discount based on determining that the geofence ID associated with the merchant matches the geofence ID associated with the consumer.

2. The method of claim 1, wherein the geofence ID associated with the consumer is associated with an organization, the organization being one of a neighborhood, a school, a workplace, or a sports team.

3. The method of claim 1, wherein the third party is an acquiring bank associated with a payment card of the consumer.

4. The method of claim 1, further comprising:
   encrypting the payment data before transmitting the payment data over the electronic network to the third party.

5. The method of claim 1, wherein the geofence ID associated with the consumer matches the geofence ID associated with the merchant when an address associated with the consumer is located within a geofence associated with the merchant.

6. The method of claim 1, further comprising:
   accessing a database including a plurality of account numbers associated with a plurality of consumers, each account number having one or more corresponding geofence IDs associated with a respective consumer.

7. The method of claim 1, wherein the consumer provides, via a consumer device, indication of a consumer selected geographic area.

8. The method of claim 7, wherein modifying the processing of the electronic payments transaction further includes processing the electronic payments transaction based on the consumer selected geographic area matching the geofence ID associated with the merchant.

* * * * *